Feb. 3, 1942. M. A. POWERS 2,271,829
POROUS PRODUCT AND ITS MANUFACTURE
Filed Nov. 7, 1939 2 Sheets-Sheet 1
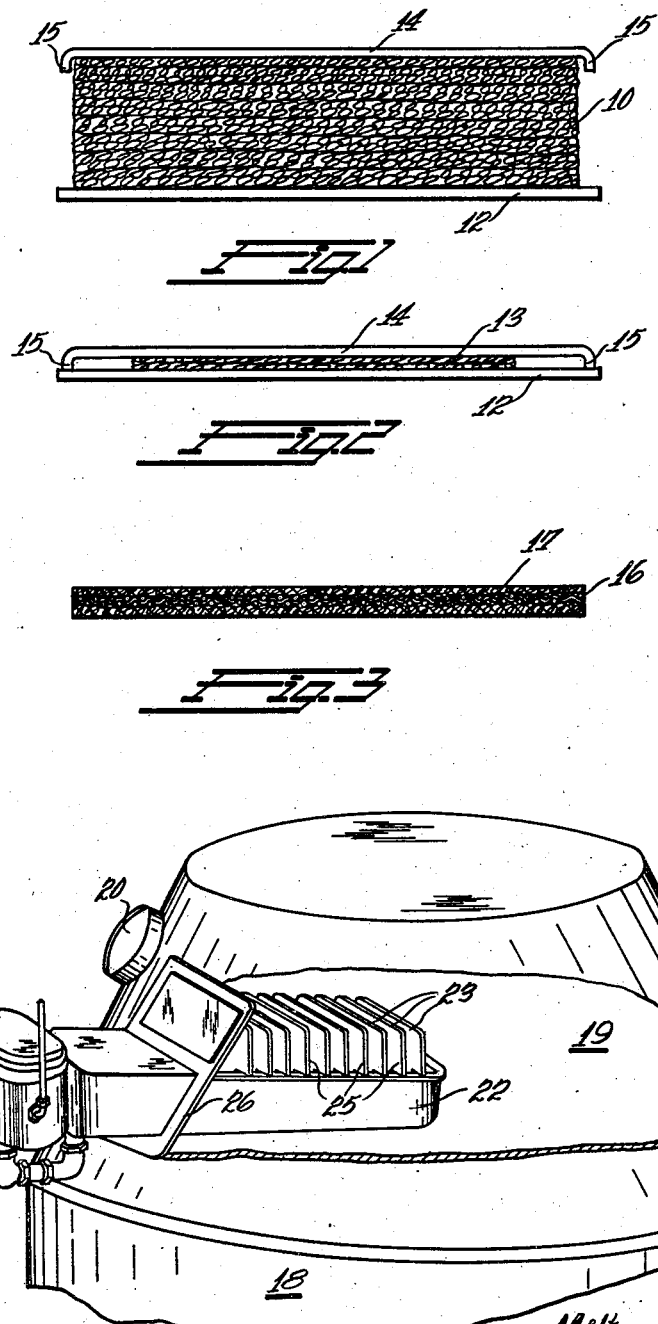

Feb. 3, 1942.    M. A. POWERS    2,271,829
POROUS PRODUCT AND ITS MANUFACTURE
Filed Nov. 7, 1939    2 Sheets-Sheet 2
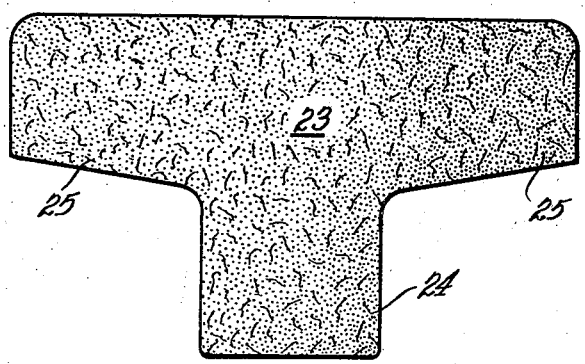
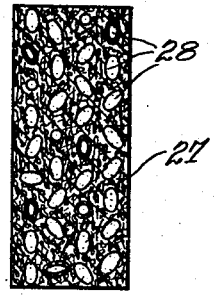
Fig.5    Fig.6    Fig.7
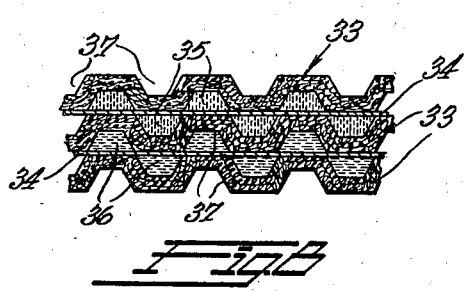
Fig.8
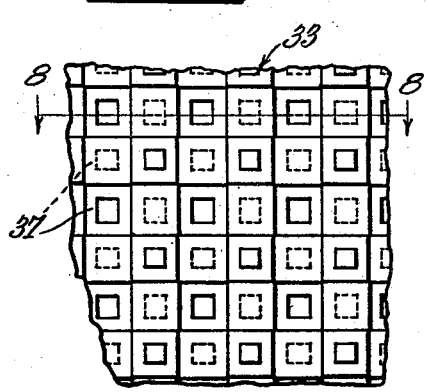
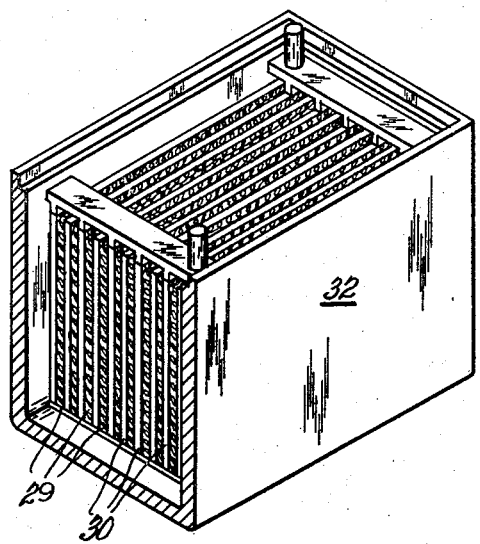
Fig.9
Inventor
Milton A. Powers
By Ralph L. Stevens
Attorney Patented Feb. 3, 1942

2,271,829

UNITED STATES PATENT OFFICE 2,271,829

POROUS PRODUCT AND ITS MANUFACTURE

Milton A. Powers, Detroit, Mich.

Application November 7, 1939, Serial No. 303,277

11 Claims. (Cl. 49—77)

This invention relates to porous products that embody hard, dry and relatively brittle material, and to the processes by which they are manufactured.

More specifically, the present invention is primarily concerned with the production of new and improved materials of the general types used where porosity is an important factor and where, in addition, there may be further important requisites such as lightness in weight, low cost, resistance to destruction by chemical solutions, resistance to heat flow and low electrical conductivity. As representative of the present fields of use for such materials, one can mention evaporator plates for soaking up liquid and transferring it to a gaseous medium; filtering elements, particularly panels for filtering air; heat insulating members such as blocks, boards and the like; and separators for the metallic plates or grids of storage batteries.

The major disadvantages of materials now used for the purposes above enumerated and for other similar purposes are that they are too expensive and/or too heavy and/or insufficiently bibulous or porous per unit of volume and/or insufficiently resistant to destruction under operating conditions and/or too bulky for their intended use. Accordingly, it is the principal object of the present invention to devise a material or product having none of these disadvantages.

The product of my invention is formed from a fibrous and fluffy mineral wool such as blown glass wool. For most purposes the wool is used in blanket or sheet form but it may take other shapes, it may be loose and it may be combined in various ways with other materials. I have discovered that a light and fibrous wool may be converted under substantially critical controlled temperatures into a rigid and relatively brittle and porous mass of low density. Time as well as temperature is important, and the treatment must be such that substantially all of the fibres are softened without, however, fusing them together in a fully molten condition. Porosity—if the initial fluffy material can be truly said to be porous in the strict sense of the word—must not be destroyed. The final product should, and surprisingly does have most of the characteristics of extremely porous earthenware, except that it is much less dense and that it is less subject to destruction by chemicals and to clogging by foreign matter contained in fluids that may pass therethrough. Although it is relatively rigid and somewhat brittle, it retains a "flexible fibre" characteristic and this is what accounts primarily for its resistance to clogging, the facility with which it may be cleaned, and its low density as compared with prior materials used for the same purposes.

Some of the subordinate objects of my invention are to devise advantageous uses for the new material of my invention, as will be seen by reference to the subject matter that follows, and to provide improved articles of manufacture.

The foregoing objects, some expressed directly and others indirectly, and further important objects of the present invention will clearly appear from a study of the following detailed description when taken in conjunction with the accompanying drawings.

In the drawings:

Figs. 1 and 2 disclose a suitable method of making the porous product of the present invention, Fig. 1 showing the initial step before heat treatment and Fig. 2 showing the change that has taken place through heat treatment.

Fig. 3 represents a section taken through a modified product formed by altering the process slightly.

Fig. 4 is a perspective view of the upper end of a hot air furnace that carries a humidifying pan filled with evaporating plates made in accordance with my invention.

Fig. 5 is a face view of one of the evaporating plates seen in Fig. 4.

Fig. 6 is a sectional view taken through a rectangular sintered block formed by further modification of the process of Figs. 1 and 2.

Fig. 7 illustrates one cell of a lead-plate storage battery, with its cover removed and one end cut away to show the use of one form of my improved product as a plate separator.

Fig. 8 is a sectional view, as seen along line 8—8 in Fig. 9, illustrating a modification of the internal cell structure of Fig. 7.

Fig. 9 is a face view of a fragmentary portion of one of the special paste-holding plates of Fig. 8, with its paste removed.

With continued reference to the drawings, wherein like characters are employed to designate like parts and with particular reference for the moment to Figs. 1 and 2, the material indicated by numeral 10 is a fluffy, fibrous, mineral substance such as blown glass wool, most of which as sold commercially has fibres approximately one one-thousandths inch thick, or less. This material is disposed upon a stainless steel plate 12 in the form of a layer the initial thickness of which is seen in Fig. 1. A plan view of the layer would vary in shape and contour, depending upon the product to be formed. The material is heated to a sufficient temperature and for a sufficient time to cause it to soften slightly throughout and to "fall" towards the plate 12 and itself become a plate 13 of greatly reduced thickness. For example, if the material is commercial glass wool having an initial thickness of one inch, it preferably is subjected to a temperature of approximately 1400 degrees Fahrenheit for a period of 5–10 minutes and falls to a thickness of one-eighth to three-sixteenths inch. If the product of manufacture is the evaporating plate subsequently described, optimum results are obtained with a temperature of 1425 degrees for six minutes.

The plate 13, after being removed from the heated zone and cooled, is porous or bibulous in character and somewhat brittle. However, it is not so brittle as to render it fragile. It retains fibrous characteristics but has to some extent the appearance of clean porous earthenware or tile. It is very light in weight for its size and for the uses to which it may be put, among them being its uses as an evaporator plate, as a filtering panel, as a grid separator for storage batteries, and as a heat insulator. In fact, with or without modification its uses are practically unlimited in all fields where porosity, or heat insulation, or electrical insulation is a desirable characteristic.

Although under perfect conditions of control in the process the action of gravity is sufficient to produce a uniform and preselected decrease in thickness of the material 10, a second plate 14 preferably is placed upon the material to ensure uniform and proper thickness in the plate 13. Also, the plate 14 may have a pair of its edges bent downwardly at 15 to make contact with plate 12 as in Fig. 2 and thus ensure against excessive compression of the softened mass. The shape of the effective surface of the plate 12—or of both effective surfaces when two plates are used—may be varied to obtain products other than those in the form of sheets or flat plates; and the coacting surfaces of the two plates may be spaced apart unequally at various points if desired to obtain a product of non-uniform wall thickness. It follows that the initial layer of material 10 will in some cases be non-uniform in thickness. Due to shrinkage in all directions (note the reduction in length of the plate 13 in Fig. 2) during the heating step it is difficult to perform precise molding with mated die elements. However, the edges of the member 13 will be sufficiently accurate in contour for most purposes. They can be ground readily to accurate shape if desired, and in fact the vitreous product is easily worked with tools. It can be drilled and sawed without fracture.

In quantity production for commercial purposes the plates 13 or similar products will be formed by first cutting a multiplicity of blanks 10 from a suitable sheet of mineral wool with a die on the order of a cookie-cutter, then placing the blanks upon plates 12 carried into and out of a long furnace by an endless conveyor, and then cooling the compressed and shrunken blanks. Preferably the temperatures are regulated to heat the blanks gradually to maximum, thus ensuring uniformity throughout the mass, and to cool them gradually during exit. When the top plates 14 are used the conveyor may be speeded up somewhat as that plate transfers heat rapidly into the upper parts of the blanks. The temperatures and heating periods of course will vary with the type or quality of mineral used, and with the sizes of the fibres.

Although blown glass wool in sheet form is the preferred material, a cheaper nodulated or loose wool gives satisfactory results; and in some cases a mixture of glass and rock wool may be used, with the lower melting point of one serving to seal the other. Also, the blank 10 may consist of two or more layers of different materials in order to vary the internal structure in different portions of the final product. For example, in some types of air filtering panels it is desirable to have the porosity gradually decrease from one surface to the other. A still further variation in the method will be observed when Fig. 6 is considered.

If a thin plate or panel of higher resistance to shattering effects is desired, a metal screen 16 may be embedded in the material as in the plate 17 of Fig. 3. In producing this form of plate the screen is disposed between two layers of mineral wool and then heated as described above. If copper or like screen is used it is preferable to coat it first with a wet mixture of powdered vitreous enamel, known as frit, and then heat the "sandwich" after the coating has dried. This ensures that the glass will stick to the metal without fully melting the glass.

Other methods of production may be followed to advantage. I have found that the wool may be heated through a predetermined cycle with but a light weight screen or stainless steel plate top and bottom for support of the material. When at the right temperature the "sandwich" is removed from the furnace and quickly pressed to the exact correct thickness. This is accomplished by using an arbor press arranged with two heavy flat plates between which the material is inserted for pressing. Heavy screws projecting from the corners of one plate located outside the pressing area may be adjusted as stops to exactly limit the closure—thus closely determining the thickness of the finished porous plate. A single rapid closure presses the hot wool to proper thickness, chills it to flat stiffness, thus producing a superior product. If desired, any special variation in the product surface or shape may be accomplished by suitable dies, such for example as may be needed to produce the corrugated plate shown in Figure 8.

Furthermore in the interest of speeding up the rapidity of the heating of the wool I have found that by pressing it while cold before processing to a reduced thickness—say from 1½ inches in the loose state, to ⅜ inch—much time can be saved. Thus, due to the faster heat penetration into the compressed material, in contrast to the slow heat flow through the loose insulating material the desired mass temperature can be reached in say one minute instead of five or six minutes.

Again, by concentrating the heat flow from the top and bottom and reducing that against the edges of the sheet, shrinkage is much reduced. By applying heat from one side only—or by supplying more heat from one side than the other the resulting porous material is of varying density—being most dense toward the surface most highly heated. Thus a filtering medium of constantly decreasing openings may be obtained whereby filtered particles of graduated size may be removed at different planes through the mass—thus giving the filter greater capacity before stoppage.

Another variation has particular merit in certain applications where strength or reinforcement is needed. I have found it possible to so control the temperature while using a suitable die structure having ribbed protrusions above the surrounding surface as to produce stiffened sections of solid glass in the final product with intervening porous areas. Thus a disc for use in filtering may be made with a supporting edge of solid glass. Another method of producing the same reenforced disc is to cut or mold a disc of porous material, then apply a flame to the periphery melting it into a solid edge.

In large scale production of my material a continuous process becomes desirable. In such case a relatively long electric furnace equipped with a continuous moving screen belt is used. The soft wool in continuous blanket form of suitable width and thickness enters one end of the furnace after being initially compressed between suitable rollers to accelerate heat absorption. The time necessary to pass through the heated zone is adjusted so that the discharged material is at proper temperature for final pressing. At the moment of exit the wool enters a set of positively spaced and driven rolls which bring it to size and chill it to hardness. The finished sheet then travels to cutters for sizing or to suitable dies for punching to special shapes. As the heated wool cools very rapidly on exposure to room atmosphere, it is necessary that it be moving at a sufficient speed to be finish rolled before cooling appreciably, and that the rolls be located close to the point of exit of the furnace.

In Fig. 4 there is shown a hot-air furnace 18 having a plenum chamber 19 through which the heated air passes on its way to the ducts 20. A humidifier unit comprising a water pan 22 fed from a float chamber 21 is associated with the furnace, the pan 22 projecting into the plenum chamber to supply moisture to the air stream. As the air is not hot enough to cause the water to boil or to vaporize rapidly, and as the stream does not make direct contact with the water in the bottom of the pan, it is necessary to increase the rate of evaporation. To accomplish this I equip the pan with a plurality of evaporating plates 23 formed of bibulous material in accordance with the method of Figs. 1 and 2 or any of the described variations thereof. Each plate 23 has a central leg 24 of approximately the pan width and that projects downwardly into the water to transfer the latter rapidly by capillary action to the body of the plate. The body has a pair of lateral wings 25 that rest upon the pan edges and that project therebeyond into the air stream to greatly increase the evaporation rate. The entire plate structure preferably is of uniform thickness, and the plurality of plates are spaced apart to obtain maximum surface exposure.

It is not new to add porous plates to an evaporating pan, nor is there any novelty in the general structure of the pan and its feeder. Heretofore the plates have been made from sections or slices of a porous fired brick, each section being relatively heavy and about one-half inch thick. The plates of the present invention are much lighter, being only about one-eighth to three-sixteenths inch in thickness and of less density than the brick; and they greatly multiply the absorption and evaporation rates of a corresponding volume of brick material. They not only feed water faster but also provide a greater evaporating surface area within a given space. Ordinarily a much longer pan is required than that shown in Fig. 4, and its free end is attached to the opposite side of the furnace to support it and its brick content. By virtue of the present invention the short pan 22 is made possible and it requires only the attachment plate 26 for support.

Anyone familiar with the temperature and space limitations of the air stream in a modern direct fired air conditioning system will fully appreciate the marked advantage of my filter plates in making such a system fully practical. With old methods such as coal firing producing a steady output of heat into a gravity circulated low speed air stream, the resulting air temperatures were very high and sufficient evaporation was obtained from evaporating pans equipped with bulky evaporator plates. However, with the advent of "off and on" firing, such as produced with an oil burner, heat is supplied only at intervals. Further and more important the air stream moves at extremely high velocity produced by a power driven blower. As a consequence in modern systems the prevailing air temperature around the evaporating plates is much lower and their capacity to evaporate is reduced to possibly one-fourth what it was in older systems. If more plates are added to increase the output trouble is encountered due to interference with the air stream. Duct dimensions around the humidifier are very limited and the obstruction produced by it seriously hampers the air flow. With my plates requiring only a fraction of the space of the old form and having improved evaporating characteristics, this objection is substantially eliminated and this type of humidifier then becomes the most desirable and effective for the modern air conditioning heating system.

There usually is solid matter in solution in the water supplied to an evaporating pan, and when the water evaporates this matter is deposited upon the plates and within the pores and eventually it checks or stops the capillary action. Present marketed plates deteriorate rapidly when attempts are made to clean them by acids or by scraping. The materials of the plates of my invention are unaffected by acids and may be cleaned by such means without scraping.

The product seen in Fig. 6 is a sintered block designed for purposes of heat insulation. It comprises a heat-treated mixture of glass wool or the like and vacuumized pellets 28. The pellets 28 are hollow and have very thin glass walls, and preferably are manufactured as taught in my copending application Ser. No. 49,265 filed November 11, 1935, now Patent No. 2,187,432, granted January 16, 1940. In making the block the pellets may be poured or arranged in layers between or amongst two or more layers of glass wool of either loose or blanket type, and then fired. The glass of the pellets must have a melting point substantially equal to or higher than that of the wool so that they will not collapse during the heat treatment that softens the wool.

In Fig. 7 there is illustrated the use of thin plates 29 made from compacted glass wool as separators for the lead plates 30 of a storage battery cell 32. These separators, when formed by the method taught in Figs. 1 and 2 or slight variations thereof, have adequate strength, sufficient porosity for the free passage of the electrolyte, and ability to withstand the heat of burning the battery parts together during assembly, and are unaffected by the electrolytic acid. If desired, vertical channels or equivalent means may be provided on the surfaces of the separators 29 to enhance the escape of gases and the gravitational movement of grid material towards the bottom of the cell.

A modified arrangement of storage battery grids and separators is disclosed in Figs. 8 and 9. Here the compacted and heat-treated glass wool plates, 33, function both as separators for the lead plates 34 and as holders for the two types of paste 35 and 36 that usually are carried by the lead plates. This permits the use of very thin lead plates and the construction of a battery much lighter in weight and lower in cost than those now marketed. In the preferred arrangement shown, the paste-pockets or recesses 37 are formed by properly shaping the steel plates that are used as dies during heat treatment and compression of the glass wool. These pockets are shown unfilled in Fig. 9. As seen in Fig. 8, the assembled plates are pressed or held together so that there is good surface contact between the pastes and the lead plates.

The pastes 35 and 36 are a peroxide of lead and a finely divided lead for association respectively with the positive and negative electrode plates 34. Obviously they may be varied within the field of equivalents, and of course the invention is not confined to the use of vitrified wool as separators and paste-holders for batteries of only the lead plate type.

It will be apparent that the methods herein disclosed may be modified considerably without departing from the spirit of the present invention, and that the products of the invention—possibly with obvious variations in some cases—may be applied to uses other than those specified. For instance, the heating step may be performed by drawing hot gases through the mineral wool. The product may be formed in larger blocks or units of other shape and subsequently sawed or otherwise divided into smaller articles of desired shapes. Therefore, I wish to be limited as is customary only by a reasonably liberal interpretation of the appended claims.

What is claimed is:

1. The method of producing a reenforced product form fibrous glass, consisting in the steps of positioning a sheet of screen-like material between at least two sheets of fibrous glass of lower melting point than said screen-like material, and subjecting the assembled sheets to a temperature sufficiently high to cause said fibrous glass to cling to said sheet of screen-like material.

2. In the method defined in claim 1, the intermediate step of coating said screen-like material with a substance ensuring sticking of said fibrous glass to said screen-like material under the maximum temperatures involved.

3. The method of forming a sintered block for purposes of heat insulation, consisting in intermingling a plurality of layers of glass or rock wool with a multiplicity of hollow vacuumized glass pellets, and subjecting the intermingled mixture to a temperature sufficient to soften said layers of wool without softening the glass of said pellets.

4. A sheet of material shaped as desired and for at least one of the purposes set forth, said sheet comprising a layer of screen-like material, and at least two layers of mineral fibres of lower melting point than said material disposed upon opposite sides thereof and adhering thereto in a vitrified state.

5. A porous and vitreous product comprising a fused and subsequently cooled mixture of glass wool and frit.

6. A product in the form of a sintered block comprising a mixture of hollow thin-walled glass pellets and quantities of glass wool, the pellets being embedded in the wool and the wool being in a substantially vitrified state.

7. In a method of making a porous product of the character described, the steps of maintaining a mass of fluffy fibrous material comprising glass wool or the like under a relatively light compacting pressure while simultaneously subjecting said mass to a temperature sufficiently high to soften the fibers of said mass, and thereafter cooling the mass to a state of substantial rigidity.

8. The method of claim 7, wherein the compacting step is performed by disposing the mass upon a substantially horizontal supporting surface and forcing the entire upper surface of said mass toward said supporting surface as the mass collapses.

9. In a method of making a porous product of the character described, the steps of heating a fibrous mass comprising mineral wool or the like until it is substantially in a state of fusion and collapse, thereafter quickly applying a relatively heavy pressure to reduce it in thickness while still hot, and subsequently cooling the mass to room temperature.

10. In a method of making a product of the character described, the steps of cold-pressing a sheet of fluffy material comprising fibrous mineral wool to a relatively small fraction of its initial thickness so that its fibers are compacted, and thereafter further collapsing the sheet by heating it until the fibers are softened and substantially in a state of fusion while simultaneously subjecting it to a pressure designed to further reduce its thickness.

11. In a method of making a product of the character described, the steps of heating a mass of fluffy material comprising glass wool or the like until it is substantially in a state of fusion, and thereafter compressing the hot mass with heavy rolls or the like to chill it quickly while reducing its volume.

MILTON A. POWERS.